United States Patent [19]

Wolfe et al.

[11] Patent Number: 5,446,515
[45] Date of Patent: Aug. 29, 1995

[54] AUTOMATIC PICTURE TAKING MACHINE

[76] Inventors: Maynard F. Wolfe, 27B, Bloc 3 Chiu Fu Far Yuen, Pokfulham; Hin Y. A. Law, c/o Swirl School of Design, Hong Kong Polytechnic, Kowloon, both of Hong Kong; Malcom J. Kravit, Apartment 203, The Trales, 5018 S. Rainbow Blvd., Las Vegas, Nev. 89118

[21] Appl. No.: 915,711
[22] PCT Filed: Jan. 29, 1991
[86] PCT No.: PCT/GB91/00124
§ 371 Date: Sep. 28, 1992
§ 102(e) Date: Sep. 28, 1992
[87] PCT Pub. No.: WO91/11748
PCT Pub. Date: Aug. 8, 1991

[30] Foreign Application Priority Data

Jan. 29, 1990 [GB] United Kingdom ............... 9001993

[51] Int. Cl.⁶ .................................. G03B 15/06
[52] U.S. Cl. .................... 354/290; 354/291
[58] Field of Search ........... 354/81, 290, 291, 293

[56] References Cited

U.S. PATENT DOCUMENTS

| | | | |
|---|---|---|---|
| 439,512 | 10/1890 | Howe | 354/291 |
| 3,776,120 | 12/1973 | Kraus | 354/290 |
| 4,348,097 | 9/1982 | Sippel | 354/290 X |
| 4,357,624 | 11/1982 | Greenberg | 348/578 |
| 4,393,394 | 7/1983 | McCoy | 348/587 |
| 4,467,349 | 8/1984 | Maloomian | 348/77 |
| 4,714,962 | 12/1987 | Levine | 348/64 |
| 4,738,526 | 4/1988 | Larish | 354/412 |
| 4,804,983 | 2/1989 | Thayer, Jr. | 354/76 |
| 4,805,037 | 2/1989 | Noble et al. | 354/76 X |
| 4,827,347 | 5/1989 | Bell | 348/333 |
| 4,835,563 | 5/1989 | Larish | 354/412 |
| 4,841,378 | 6/1989 | Cogert | 358/335 |
| 4,864,410 | 9/1989 | Andrews et al. | 358/443 |
| 4,888,605 | 12/1989 | Matsumoto | 354/75 |
| 5,023,638 | 6/1991 | Siegesleuthner et al. | 354/126 |
| 5,038,213 | 8/1991 | Yoda | 348/376 |
| 5,072,246 | 12/1991 | Thayer et al. | 354/78 |
| 5,109,242 | 4/1992 | Massarsky | 354/75 |

FOREIGN PATENT DOCUMENTS

| | | |
|---|---|---|
| 0233736 | 8/1987 | European Pat. Off. . |
| 0262693 | 4/1988 | European Pat. Off. . |
| 0326515 | 8/1989 | European Pat. Off. . |
| 983902 | 6/1951 | France . |
| 1366841 | 6/1964 | France . |
| 2570843 | 3/1986 | France . |
| 2343284 | 8/1972 | Germany . |
| 2301299 | 7/1978 | Germany . |
| 482219 | 1/1970 | Switzerland . |
| 9010251 | 9/1990 | WIPO . |

*Primary Examiner*—Howard B. Blankenship
*Attorney, Agent, or Firm*—Fisher, Christen & Sabol

[57] ABSTRACT

An automatic picture taking machine of the photobooth kind has a camera within a housing and an automatic mechanism for taking the picture of a subject within a picture taking zone. For height adjustment purposes, the camera is moved bodily up and down so that a height adjustable seat within the booth is not required. The background may also be height adjustable and to achieve this the background may be provided on a sheet which is movable up and down between top and bottom rolls.

29 Claims, 3 Drawing Sheets

AUTOMATIC PICTURE TAKING MACHINE

TECHNICAL FIELD

This invention relates to a machine, particularly a coin (or token or similar) operated machine, for automatic picture taking.

BACKGROUND ART

Photobooths or photomachines that are controlled without an operator by vending machine mechanisms as self-service units are well-known.

These self-service photobooth units require that the subject using the facility produces "self-taken" photographs (or other recorded images such as video tapes, etc.) that are thereafter delivered to the subject. However, prior to activating the unit, the subject must adjust a seat, (usually vertically up or down), so that the subject is in the field of view covered by the camera lens. This is such that the subject's head will be well within the camera's field of view.

Known photobooths have a mirror or target marked over or next to the camera lens with instructions to the subject to be "eye-level" to this mark, and look at the mark when the picture is taken. In order to compensate for the inaccuracy of this method and to make sure all of the subject is within the camera's field of view, this field of view or picture area is made to cover a wider field than is really necessary to compensate for a subject not being in the correct position. This results in wasted areas in a finished photograph.

A child moving, or an improperly adjusted seat, can also result in a wasted or unsatisfactory photograph.

One object of the present invention is to provide an automatic picture taking machine with which height adjustment of the subject relative to the camera can be effected in a particularly convenient and effective manner.

DISCLOSURE OF THE INVENTION

According to one aspect of the present invention therefore there is provided an automatic picture taking machine comprising a housing containing a camera and an automatic apparatus which when actuated causes the camera to take a picture of a subject located in a zone near to the housing characterised in that an adjustment device is provided for adjusting the height of the camera relative to the subject by bodily moving the camera in an upright direction.

With this arrangement, the whole image taking means or camera can be moved bodily substantially vertically within the housing whereby the invention eliminates the need to have a fixed and/or adjustable seat in a photobooth, and allows the subject to stand and not have to sit in front of the camera. Height adjustment can therefore be effected conveniently without need to carry out seat adjustments and without need for the subject to be in a seating position. It is however to be understood that if desired, a seat may be provided so that the machine can be used with a seated subject and such seat may be adjustable.

The invention can also eliminate the potential danger of a fall from a seat by a subject which can be a problem with known photobooths, especially for a young child whose parent is outside the photobooth when the picture of the child is being taken. In particular, allowing the subject to stand and moving the image taking means to the subject rather than the subject to the image taking means can eliminate a potential hazard.

The correct field of view of image taking means to subject is suitably achieved by the movement of the image taking means combined with a viewing means which preferably provides a display on an electronic monitor, which display may be the same or approximately the same image as that to be taken with the image taking means. This combined arrangement can be moved as a unit by the adjustment device, to compensate for different heights of subjects using the machine.

The adjustment device may be operable by the subject using controls in the picture taking zone and/or by another person using controls outside the picture taking zone and/or automatically with a subject height sensor, to adjust the camera and viewing means (where provided), and the picture to be taken may be displayed on a monitor viewable in the picture taking zone and/or on a monitor outside the zone. In the case of a monitor in the picture taking zone, this may be movable with the image taking means and viewing means.

The aforesaid viewing means may comprise a device, such as a video camera, separate from and disposed close to the picture-taking camera or its lens. Alternatively and preferably a video camera may be used both as the picture-taking camera and the viewing means as a combined single image unit.

The picture-taking camera may be arranged to produce a photographic print, a video tape or any other form of image recording as appropriate and as desired. Reference is made to PCT application PCT/GB 90/00306 (WO 90/10251) which describes the use of a thermal printer to produce colour prints from a video camera in automatic picture taking equipment.

The movement (i.e. travel and position) effected by the adjustment device is preferably controlled by electronic or mechanical means, or a combination of both. Such movement may take place on holding rails or tracks. Such holding rails or tracks may carry the camera, the said viewing means, the said monitor in the picture taking zone (i.e. the above mentioned single image unit), and preferably also lights for illuminating the subject.

The aforesaid image unit's range of travel and position is suitably viewed through an electronic monitor as mentioned above, which monitor may be a television type sound and picture monitor, and/or receivers. When the subject being viewed on a monitor is in the proper position, then the travel of the image unit can be stopped and the picture taken thereby enabling distortion or "cut-off" of part of the subject in the picture to be eliminated, since it can be ensured that the subject is in the proper position of the field of view of the image taking means.

This controlled and monitored movement of the image unit means that regardless of the height of the subject, and given a standard field of view from a picture-taking lens, the height adjustment of that field of view may be dependent only on the travel distance of the image unit. In this way pictures of very young children can be taken without the need for them to use a vertically adjustable seat which can be dangerous as they can easily become frightened, due to, for example, the flash or glare of light used to take the picture, and thereby perhaps fall off the seat that has been extended up to accommodate their height.

The elimination of a seat also allows people confined to wheelchairs and others who are disabled to use the machine. Furthermore, without a fixed seat the use of the machine by more than one subject at a time will be possible so that two or more subjects can more easily appear in the same picture.

The vertical travel of the image unit may be preset by the adjustment device in measured steps, such as approximate height or even age for young children, or freely within the travel distance of the image unit depending on the design of the mechanism controlling the movement of the image unit and/or based on the adjustment manually made.

Preferably, a background is provided, and suitably means are provided to control the movement of the background in relation to the image taking means. In consequence, if the design or decoration of the background requires the subject to be in an approximate or fixed position in relation to that background, and if the height of the subject requires height adjustment to compensate for the subject height, then the background height can also be adjusted, and furthermore the positioning of the background can be viewed in the (or each) monitor as aforesaid (where this is provided) prior to the picture being taken.

Thus, and in accordance with a second aspect of the present invention which is preferably, but not necessarily combined with the first aspect of the invention, there is provided an automatic picture-taking machine comprising a housing containing a camera and an automatic apparatus which when activated causes the camera to take a picture of a subject located in a zone near to the housing, said zone having a back structure thereto supporting a background display, characterised in that the background display is adjustable in an upright direction.

The background suitably comprises a sheet supported between upper and lower rolls so that it can be wound therebetween.

The arrangement may be such that different regions or parts of the sheet can be stopped in a selected position thereby allowing a choice of more than one background from the sheet. Thus the upright adjustment of the background display may be for the purpose of changing the display. Alternatively or additionally it may be for the purpose of adjusting the height of a particular display relative to the camera. It is even possible for there to be only a single background display which is movable up and down for height adjustment purposes.

The movement of the background for height adjustment purposes relative to the camera may be controlled so that as the image taking means is moved by the adjustment device, the background is also moved. Alternatively, the background can be controlled independently, and in particular can be adjusted manually, or automatically for example by an infrared focusing device that will measure the distance from the device to the top of the subject, and correctly position the background with regard to that distance.

Lighting for viewing and/or picture taking purposes is preferably provided and may be arranged to be varied by user controls according to the position of the aforesaid image unit, and the above mentioned background and these lighting changes can be seen on the above mentioned monitor prior to taking a picture.

The user may have a choice as to the control of the image unit, lighting, background and the actual taking of the picture by using controls outside the picture taking zone, or controls inside the zone. Controls inside the zone can be activated by the subject standing in the correct position (which may be indicated) inside the zone at the desired approximate picture taking position. Alternatively, controls outside the zone can be operated by another party.

The controls inside the zone may include a footswitch or foot actuated sensor on the floor in the desired subject to camera lens horizontal position in front of the lens, and pressure on this footswitch may start a sequence of image unit movement, as well as varying lights and moving the background, with a final push of the footswitch activating an image recording or picture-taking sequence.

Instructions for the use of the machine can suitably be given on the aforesaid monitor. These instructions can be selective depending on the selection of the manual control or control function outside or inside the zone.

As mentioned above, height adjustment effected by the adjustment device may be of a continuous or step wise nature and this may be within a single range, or may be within a range selected from different ranges. Thus, for example, if the subjects' age range is selected then the image unit can move to the pre-programmed position that corresponds to, for example, a child's height. Also, the aforesaid monitor suitably gives instructions to a child to watch the screen, look for the birdy, or see a cartoon, thus relaxing the subject while at the same time instructing a person observing the child from the aforesaid monitor to be ready to take a picture when the child laughs. However, the image can also be "taken" or recorded automatically if this option is selected.

Selecting another age group, or using a different classification like height, male or female, the arrangement can also be programmed for the display of different instructions that would be shown on the aforesaid monitors both inside and outside the picture-taking zone with or without sound, such as verbal instructions, music, etc.

The aforesaid outside monitor screen is preferably programmed to play as a point of sale display until a token or money is inserted into a coin mechanism of the machine and the unit is activated for a picture-taking or image recording sequence.

Sensor means (preferably in the form of a proximity or mass sensor such as that used in certain types of intrusion alarms or similar devices) that detects a body mass nearby is suitably incorporated in the machine, so if a person comes near the machine, the presence of the person's body mass triggers the sensor means which may turn on the aforesaid outside monitor and a video tape, and starts the transmission of the above mentioned point of sale material on the monitor outside the zone. Alternatively, when a subject enters the zone, a video recording may be activated, for example, to give the subject instructions on how to deposit his token or money into a vending machine mechanism of the machine.

An autofocus mechanism may be incorporated as part of the aforesaid image unit to ensure that the camera lens is focused on the subject or subjects within the picture-taking zone. If the subject moves too close to the lens then the picture-taking sequence may be interrupted and the subject instructed to move to the proper position at which focusing is possible. This also ensures the subject will be in the proper position to use, for example, the aforesaid footswitch control inside the picture-taking zone to start the image recording sequence.

Use of the aforesaid inside monitor so that the subject can view himself (or the person using the outside monitor can view the subject) can also give the possibility of recording images with various special effects, such as electronic or optically generated enhancements, distortions and other changes in the image or combinations of the image shown on the monitor, which can then be recorded on media such as magnetic tape, film, paper, etc. These images in conjunction and/or combined with the image of the subject can then be shown on the monitor or monitors prior to being recorded or stored on the selected media for a hard copy print, tape, etc.

The machine of the invention may be in the form of a booth whereby the picture-taking zone is a partially or completely enclosed region in front of the housing containing the camera and associated apparatus.

BRIEF DESCRIPTION OF THE DRAWINGS

The invention will now be described further by way of example only and with reference to the accompanying drawings, in which.

DESCRIPTION OF THE PREFERRED EMBODIMENT

Figure 1:
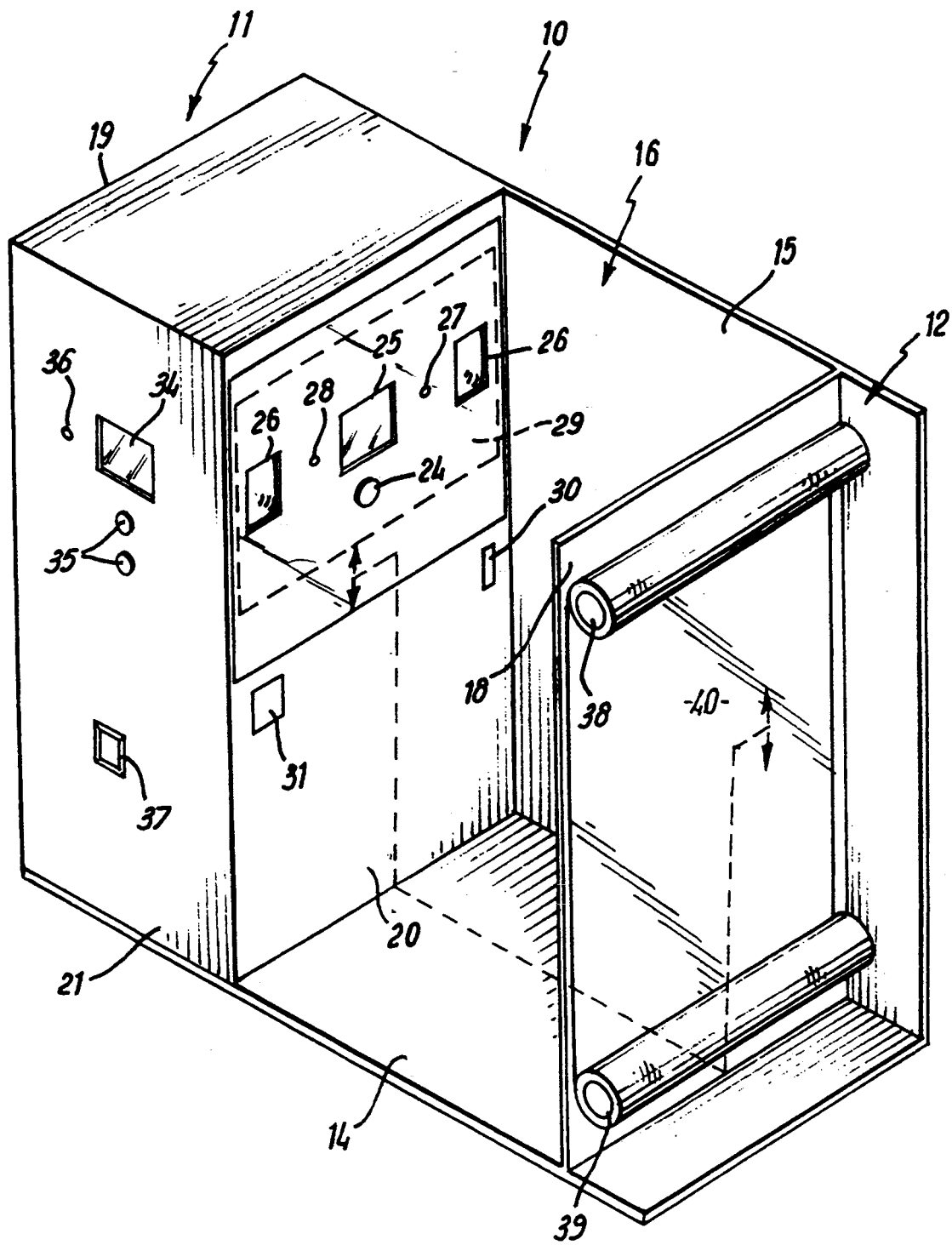
FIG. 1 is a perspective view of an automatic picture-taking machine in the form of a photobooth in accordance with one embodiment of the invention, parts of the photobooth being omitted for the sake of clarity.
Figure 2:
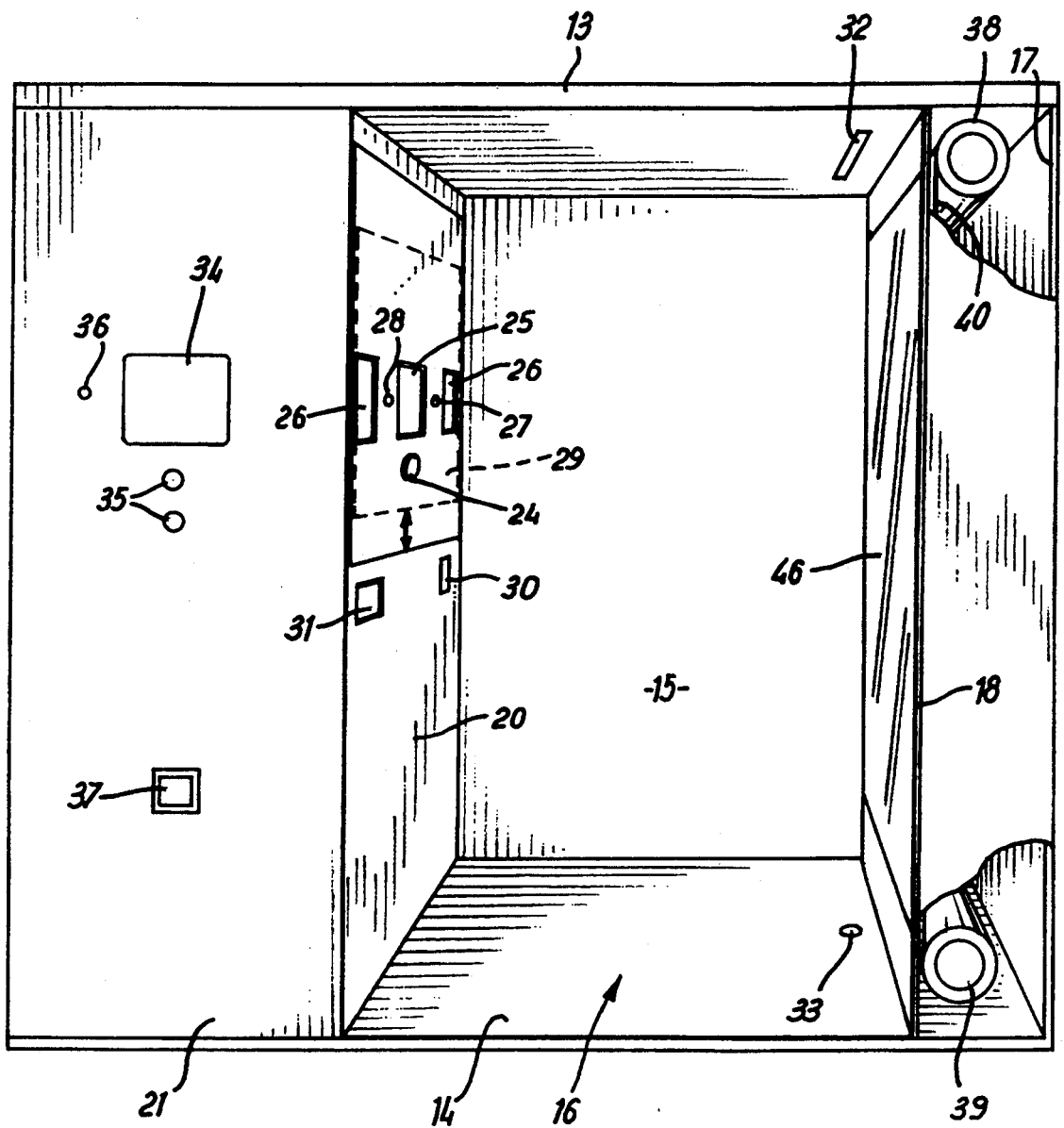
FIG. 2 is a side view of the photobooth with parts cut away.
Figure 3:
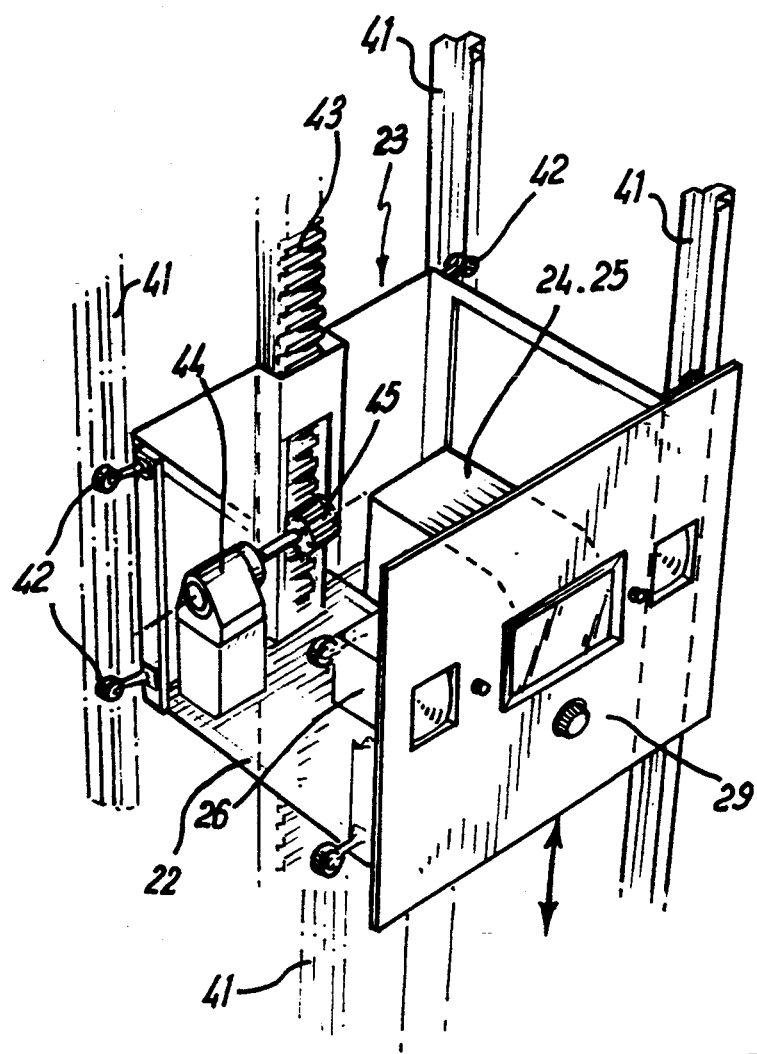
FIG. 3 is a diagrammatic perspective view showing components within a housing of the booth.

With reference to the drawings, the machine is in the form of a floor-standing booth 10 having an upstanding main box structure 11, an upstanding rear box structure 12, a roof 13 linking the tops of the box structures 11, 12, a floor 14 linking the bottom of the box structures 11, 12, and a side wall 15 linking one side of the main box structure 11 and the corresponding side of the rear box structure 12.

A picture-taking zone 16 is defined between the box structures 11, 12 and is closed on one side by the side wall 15. The opposite side of the picture-taking zone 16 may be wholly open as shown, or there may be an openable closure arrangement such as a curtain or a door extending thereacross. The picture-taking zone 16 is dimensioned to allow at least one person to stand between the box structures 11, 12 close to or in contact with the rear box structure 12.

The rear box structure 12 has an outwardly facing opaque wall 17, and an inwardly facing wall 18 consisting of (or incorporating in its central region) a transparent (or translucent) panel 46. The enclosure defined between the walls 17, 18 is closed at opposite sides and contains a movable background arrangement described in more detail hereinafter.

The main box structure 11 has an outwardly facing opaque wall 19, an inwardly facing wall 20 consisting of (or incorporating in its central region) a transparent panel, and opaque side walls 21. The enclosure defined between these walls 19, 20, 21 contains a platform 22 which is movable up and down along a substantially vertical plane along holding rails or tracks 41 (as described in more detail hereinafter).

On the platform 22 there are mounted: a video camera 24, an electronic display monitor (VDU) 25, lights 26, a focusing device 27 and a proximity detector 28. The platform 22 has a front opaque wall 29 with apertures through which the camera 24, VDU 25, lights 26, focusing device 27 and detector 28 face horizontally forwardly and are exposed through the transparent panel in the front wall 20. The panel in the wall 20 may be smoked or half silvered so that a person within the picture-taking zone 16 can see the monitor 25 (at least when this is activated), and is exposed to the camera 24, lights 26, focusing device 27 and proximity detector 28, but such person cannot readily see the front wall 29 of the platform 22 or other articles and structures within the box structure 11 above and below the wall 29.

Within the box structure 11 beneath the platform 22 there is fixedly mounted a computerised control system (not shown). The camera 24, VDU 25, lights 26, focusing device 27, and proximity detector 28 are connected to this control system.

On the front wall 20 of the main box structure 11 there is a slot 30 leading to a coin (or token or similar) mechanism within the box structure 11, and this mechanism is connected to the control system. The control system also has connected thereto: manual controls 31 on the front wall 20 of the box structure 11, an overhead proximity sensor 32 in the rear part of the under surface of the roof 13, a foot switch 33 at the rear part of the floor, a motor drive mechanism (not shown) for the background arrangement, a VDU 34 mounted at a fixed position within the box structure 11 and visible from the outside of the booth on the side wall 21 of the box structure 11 adjacent to the open side of the picture-taking zone 16, manually operable controls 35 beneath the VDU, and a proximity detector 36 adjacent the VDU 34. The side wall 21 of the box structure 11 also contains a dispense outlet 37 and within the box structure 11 there is a printer connected to the control system and arranged to dispense prints to the outlet 37.

The movable background arrangement comprises upper and lower horizontal rollers 38, 39 between which runs a sheet 40 immediately behind the transparent panel 46 of the wall 18. The surface of the sheet 40 can be seen within the picture-taking zone through the panel 46 of the wall 18 and it may be provided with different regions each having thereon a respective pattern and/or colouration and/or pictured and/or printed area. The above mentioned motor drive mechanism (not shown) is connected to the rollers 38, 39 so that the sheet 40 can be wound from one to the other of the rollers (in either direction) whereby the different regions can be successively selected as desired, and also a selected region can be moved upwards and downwards for height adjustment purposes.

Within the main box structure 11, the platform 22 is mounted between four rigidly fixed upright guide tracks 41. The platform 22 has thereon an upstanding framework 23 which supports the above mentioned front wall 29 and at four bottom corners and four top corners there are rollers 42 which locate within the guide tracks 41 so as to be retained therewithin whilst being freely movable therealong. There is also an upright fixed toothed rack 43 extending centrally between the two rearmost guide tracks 41. On the platform 22 there is fixed a drive motor 44 which is connected to the control system and which is drivably linked to the rack 43 via a pinion gear 45. The platform 22 can be moved up and down in a carefully controlled manner by appropriate driving of the motor 44. When the motor 44 is deactuated, the platform 22 may be held in position by the gearing of the rack and pinion arrangement (and any associated gears) and/or by a brake mechanism or the like (not shown).

Prior to picture-taking, the platform 22 may be located in its last-adjusted position, or it may be located in a predetermined mid-point waiting position. Alternatively, provision may be made for pre-setting the position of the platform 22 using the manual controls 31, 35, for example by reference to the approximate height, or age of the subject. This pre-setting may move the platform 22 to a mid-point, or other point which is an acceptable starting point, and/or is within a range of travel appropriate to, the set height or age.

The subject who wishes to take a picture enters the booth and stands facing the front wall 20 with his back to the wall 18. Before or after actuation of the machine by insertion of coins or tokens into the coin mechanism through the slot 30 the subject can move the platform 22 up and down by operating the controls 31. The video camera 24 operates to take a picture of the subject, as illuminated by the lights 26, and the picture is displayed to the subject on the VDU 25. The subject is given the opportunity to change the background (by selection of a desired of the regions), using the manual controls 31. When the subject is satisfied with the displayed picture, he can operate the controls 31 to initiate a picture printing sequence. That is, the output of the camera 24 is fed to the printer and the resulting print is dispensed through the outlet 37.

The outside monitor 34 may show the same picture as the inside monitor 25 and functions such as height control of the platform 22 and/or background selection and/or picture printing can be controlled by a person other than the subject using the outside controls 35, instead of the controls 31. This is particularly helpful where the subject is a small child.

The lights 26 (which may be flashlights or floodlights) may be of predetermined intensity and distribution for picture-taking. If desired however provision may be made for adjusting intensity and/or distribution using the controls 31 and/or the controls 35 by reference to the picture on the VDU 25 or the VDU 34.

With regard to the background, each selected region may adopt a predetermined position behind the panel 46 of the wall 18. Alternatively each selected region may be height adjustable. This may be effected automatically in correspondence with the height adjustment of the platform 22, and/or it may be manually height adjustable using the controls 31 or the controls 35.

If desired the sheet 40 of the background arrangement may have only one kind of background, instead of different, selectable regions, in which case the winding of the sheet between the rollers is used for height adjustment purposes only, this being achieved as described in the preceding paragraph.

One or more of the height adjustments described above may be effected automatically using the proximity detector 32 (which may be an infrared focusing device) which acts to measure the distance from the detector 32 of the top of the subject standing in front of the background. The computed distance may be used to initially pre-set the approximate height of the platform 22 and/or to effect the final adjustment of the height of the platform prior to picture printing and/or to adjust the height of the background relative to the subject in the booth.

One or more of the control functions mentioned above may be effected by operation of the foot switch 33 which may be single acting or multiple acting. The foot switch 33 may be located at the correct position in relation to the proper subject to camera lens horizontal separation whereby the subject can correctly position himself or herself by appropriate foot contact with the switch. By way of example, pressure on the foot switch 33 may start the movement of the platform 22, and may also vary the light intensity and move the background. A final push of the switch 33 may then actuate the machine to print a picture. These operations may be in accordance with a predetermined sequence.

The outside proximity detector 36 may be an infrared or mass sensor or the like arranged to detect a person who is near to the machine so as to operate a point of sale display or 'attract mode' on the VDU 34. The proximity detector 28 on the inside may be of similar form and may operate, when actuated, to initiate a display on the VDU 25 giving instructions with regard to the operation of the booth.

The focusing device 27 may be of an ultrasonic or infrared kind and may be arranged to effect automatic focusing of the lens of the camera 24 so that a clear, sharp image of the subject is automatically and reliably achieved prior to picture printing.

With the embodiment described, the machine is particularly efficient and effective in that a picture can be taken of a subject without wasting any area in the resultant photograph, since the subject's head can be accurately defined within the field of view of the camera, by looking at the VDU 25 and moving the camera as appropriate.

With regard to the printing apparatus this may be of the kind described in PCT application WO 90/10251 to which reference is made for further details of such apparatus and of other features which may be incorporated in the present invention as appropriate. Other printing apparatus may be used. Also, if desired, the arrangement may be such that as image recording such as a disc or video tape is produced and dispensed, rather than a visual print, the visual print or representation being produced subsequently externally of the screen.

It is of course to be understood that the invention is not intended to be restricted to the details of the above embodiment which are described by way of example only. Thus, for example, any suitable mechanism may be used for moving the platform 22 instead of, or additionally to the rack and pinion described. In particular, the platform 22 may be lifted and lowered with a pulley or winch system and/or hydraulically or pneumatically using piston and cylinder actuators.

With regard to the background arrangement instead of using a sheet wound between two rollers it would be possible to used an endless band or any other suitable arrangement capable of giving an actual or simulated height adjustable display.

With the invention as described above, the image taking means (i.e. the camera) 24 is movable bodily in its entirety upwards and downwards, preferably together with one or more other devices which need to be (or preferably should be) height adjusted, namely: the monitor 25 viewable within the picture taking zone 16, the lights 26, the focusing device 27 and the proximity detector 28. The camera 24 (and indeed also the (or each) other bodily moved device can therefore be held in a fixed angular disposition irrespective of the adjustment movement, which disposition may be a fixed horizontal disposition (or a fixed small angular relationship to the horizontal) suited to direct optical scanning of the subject (i.e. along a straight optical path). Alternatively, such disposition may be vertical or at a large angular relationship to the horizontal with mirrors being used to permit scanning of the subject through an angular optical path. It is however also possible to implement a change in angular disposition during bodily movement whereby for example, as the camera is moved in the upright direction it also tilts. Similarly, as the camera (and the or each other bodily moved device) moves in the upright direction it may be held in a fixed lateral disposition so that movement is confined to movement along a vertical (or substantially) path. Alternatively, the arrangement may be such that the upright movement is accompanied by appreciable lateral movement for example by moving the camera along a path appreciably inclined to the vertical (which path may be straight or curved or stepped) and/or by introducing the possibility of a lateral (e.g. horizontal or substantially horizontal) displacement at one or more positions in the upright path of movement of the camera.

The above mentioned changes in angular disposition and/or lateral displacement may be effected in a predetermined manner and/or in response to automatic control (e.g. triggered by a height sensor or focusing device) and/or by manual control.

We claim:

1. An automatic picture taking machine comprising a housing containing a camera and an automatic apparatus which when actuated causes the camera to take a picture of a subject located in a zone near to the housing, a viewing means for producing a display of a picture to be taken by the camera, an adjustment device for adjusting the height of the camera relative to the subject by bodily moving the camera, the camera being a video camera which acts both for picture taking purposes and as said viewing means, and lighting for illuminating said zone, wherein said adjustment device is operable for adjusting the height of the lighting together with the height of the camera.

2. An automatic picture taking machine comprising a housing containing a camera and an automatic apparatus which when activated causes the camera to take a picture of a subject located in a zone near to the housing, said zone having a back structure thereto having at least one background display region, said structure being movable upwards and downwards to adjust the height of a display region relative to the subject, said background display being linked to an adjustment device so that height adjustment of the display is effected automatically in correspondence with height adjustment of the camera.

3. A machine according to claim 2 wherein the back structure comprises a sheet movable upwards and downwards between rolls.

4. A machine according to claim 2 wherein the back structure has a plurality of background display regions and the back structure is also movable upwards and downwards for selecting individual said regions.

5. An automatic picture taking machine comprising:
a housing,
an image unit including a video camera supported on a support structure within the housing, said support structure being mounted on said housing so that the image unit is movable bodily in its entirety along a path upwards and downwards,
an automatic apparatus actuable to cause the camera to take a picture of a subject located in a zone near to the housing,
a viewing means connected to the video camera to produce a display of said picture on an electronic monitor,
a print producing means connected to the video camera and operable to produce a print of said picture, the video camera acting both for producing said display and for producing said print, and
an adjustment means operable to effect said bodily movement of the image unit to adjust the height of the video camera with the image unit relative to the subject.

6. A machine according to claim 5 wherein the adjustment means is operable for adjusting the height of the viewing means together with the camera.

7. A machine according to claim 5 wherein the viewing means is arranged to produce said display on an electronic monitor which is located outside the picture taking zone.

8. A machine according to claim 5 wherein said support structure of the image unit is movable upwards and downwards on rails or tracks.

9. A machine according to claim 5 wherein the height adjustment is effected by the adjustment device by movement of the image unit upwards and downwards in a continuous manner within a predetermined range.

10. A machine according to claim 5 wherein the height adjustment is effected by the adjustment means by movement of the image unit upwards and downwards stepwise between predetermined positions.

11. A machine according to claim 5 wherein said zone has a back structure thereto having at least one background display region, the back structure comprising a sheet movable upwards and downwards between rolls.

12. A machine according to claim 5 wherein said zone has a back structure thereto having at least one background display region, an adjustment means is provided for adjusting the height of the camera relative to the subject, and the back structure is linked to the adjustment means so that height adjustment of the display region is effected automatically in correspondence with height adjustment of the camera.

13. A machine according to claim 5 wherein user controls are provided for effecting height adjustments.

14. A machine according to claim 13 wherein said controls include a foot control inside the picture-taking zone.

15. A machine according to claim 13 wherein said controls include manual controls both inside and outside the picture-taking zone whereby height adjustments can be effected optionally from inside or outside the zone.

16. A machine according to claim 5 wherein one or more height sensors are provided within the picture-taking zone whereby one or more control functions are arranged to be effected automatically.

17. A machine according to claim 5 wherein the machine is in the form of a coin (or token) operated booth.

18. A machine according to claim 8 wherein the height adjustment is effected by the adjustment means by movement of the image unit upwards and downwards in a continuous manner within a predetermined range.

19. A machine according to claim 8 wherein the height adjustment is effected by the adjustment means by movement of the image unit upwards and downwards stepwise between predetermined positions.

20. An automatic picture taking machine comprising:
a housing, an image unit including a video camera and an electronic monitor supported on a support structure within the housing, said support structure being mounted on said housing so that the image unit is movable bodily in its entirety along a path upwards and downwards, an automatic apparatus actuable to cause the camera to take a picture of a subject located in a zone near to the housing, a viewing means connected to the video camera to produce a display of said picture on said electronic monitor, a print producing means connected to the video camera and operable to produce a print of said picture, the video camera acting both for producing said display and for producing said print, and an adjustment means operable to effect said bodily movement of the image unit to adjust the height of the video camera and the electronic monitor with the image unit relative to the subject.

21. A machine according to claim 20 wherein the viewing means is arranged to produce said display on an electronic monitor which is located outside the picture taking zone.

22. A machine according to claim 20 wherein lighting is provided for illuminating said zone characterised in that the adjustment means is operable for adjusting the height of the lighting together with the camera.

23. A machine according to claim 20 wherein said support structure of the image unit is movable upwards and downwards on rails or tracks.

24. A machine according to claim 20 wherein the height adjustment is effected by the adjustment means by movement of the image unit upwards and downwards in a continuous manner within a predetermined range.

25. A machine according to claim 20 wherein the height adjustment is effected by the adjustment means by movement of the image unit upwards and downwards stepwise between predetermined positions.

26. A machine according to claim 20 wherein said zone has a back structure thereto having at least one background display region, an adjustment means is provided for adjusting the height of the camera relative to the subject, and the back structure is linked to the adjustment means so that height adjustment of the display region is effected automatically in correspondence with height adjustment of the camera.

27. A machine according to claim 20 wherein one or more height sensors are provided within the picture-taking zone whereby one or more control functions are arranged to be effected automatically.

28. A machine according to claim 20 wherein one or more height sensors are provided within the picture-taking zone whereby one or more control functions are arranged to be effected automatically.

29. A machine according to claim 20 wherein the machine is in the form of a coin (or token) operated booth.

* * * * *